(12) United States Patent
Lee et al.

(10) Patent No.: US 9,910,247 B2
(45) Date of Patent: Mar. 6, 2018

(54) FOCUS HUNTING PREVENTION FOR PHASE DETECTION AUTO FOCUS (AF)

(71) Applicant: QUALCOMM Incorporated, San Diego, CA (US)

(72) Inventors: Jisoo Lee, San Diego, CA (US); Leung Chun Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 15/002,731

(22) Filed: Jan. 21, 2016

(65) Prior Publication Data
US 2017/0212327 A1   Jul. 27, 2017

(51) Int. Cl.
*H04N 5/232* (2006.01)
*G02B 7/36* (2006.01)

(52) U.S. Cl.
CPC ......... *G02B 7/365* (2013.01); *H04N 5/23212* (2013.01)

(58) Field of Classification Search
CPC ............................ H04N 5/23212; G02B 7/365
See application file for complete search history.

(56) References Cited

U.S. PATENT DOCUMENTS

| | | | |
|---|---|---|---|
| 5,628,036 A * | 5/1997 | Ozawa | G02B 7/28 396/102 |
| 7,697,830 B2 | 4/2010 | Ide et al. | |
| 8,472,798 B2 | 6/2013 | Molin et al. | |
| 8,538,252 B2 * | 9/2013 | Nozaki | G02B 7/36 396/123 |
| 8,750,699 B2 | 6/2014 | Kawarada | |
| 2008/0043136 A1 * | 2/2008 | Yamazaki | G03B 3/00 348/345 |
| 2011/0261251 A1 * | 10/2011 | Okamoto | G02B 7/102 348/345 |

(Continued)

FOREIGN PATENT DOCUMENTS

| | | |
|---|---|---|
| JP | 2013037101 A | 2/2013 |
| JP | 2014203049 A | 10/2014 |
| WO | WO-2015025590 A1 | 2/2015 |

OTHER PUBLICATIONS

International Search Report and Written Opinion—PCT/US2017/012023—ISA/EPO—dated Apr. 12, 2017.

*Primary Examiner* — Lin Ye
*Assistant Examiner* — John H Morehead, III
(74) *Attorney, Agent, or Firm* — Knobbe, Martens, Olson & Bear, LLP

(57) ABSTRACT

Methods and apparatuses for focus hunting prevention for phase detection auto focus (AF) are disclosed. In one aspect, the method is operable by an imaging device, for preventing focus hunting during a phase detection AF process. The method may include capturing an image of a scene and generating a phase difference value and a confidence level for the phase difference value based on the image. The method may also include calculating a focus hunting metric based at least in part on the phase difference value and the confidence level. The method may further include preventing focus hunting via at least one of preventing the start of the focus search and terminating the focus search, in response to the focus hunting metric meeting or exceeding a defined threshold value.

30 Claims, 7 Drawing Sheets

(56) References Cited

U.S. PATENT DOCUMENTS

| | | | |
|---|---|---|---|
| 2012/0169917 A1* | 7/2012 | Isobe | G02B 7/08 |
| | | | 348/345 |
| 2013/0010179 A1* | 1/2013 | Takahara | G02B 7/36 |
| | | | 348/353 |
| 2013/0141630 A1* | 6/2013 | Li | H04N 5/23212 |
| | | | 348/348 |
| 2013/0182152 A1* | 7/2013 | Li | G02B 7/38 |
| | | | 348/241 |
| 2013/0235250 A1* | 9/2013 | Fainstain | H04N 5/23212 |
| | | | 348/345 |
| 2014/0098283 A1 | 4/2014 | Nguyen | |
| 2014/0267673 A1* | 9/2014 | Yamamoto | G02B 7/34 |
| | | | 348/79 |
| 2014/0267839 A1* | 9/2014 | Nishimaki | H04N 5/367 |
| | | | 348/246 |
| 2017/0017136 A1* | 1/2017 | Kao | G03B 13/20 |

\* cited by examiner

FOCUS HUNTING PREVENTION FOR PHASE DETECTION AUTO FOCUS (AF)

TECHNICAL FIELD

The present application relates generally to digital image processing, and more specifically, to methods and systems for preventing focus hunting during phase detection auto focus (AF).

BACKGROUND

Imaging devices, such as digital cameras, may perform phase detection auto focus (AF) in order to determine a lens shift value used to shift a current lens position such that a captured image of a scene will be in focus. Phase detection AF may include the measurement of a phase difference between specialized phase detection pixels. The accuracy of the phase detection measurement may depend on various visual properties of the scene. Accordingly, a confidence level may be calculate for each phase detection measurement which is indicative of the likelihood that the phase detection measurement is accurate. In this context, there is a need for improvement in the accuracy of phase detection AF based on the measured phase difference and the corresponding confidence level.

SUMMARY

The systems, methods and devices of this disclosure each have several innovative aspects, no single one of which is solely responsible for the desirable attributes disclosed herein.

In one aspect, there is provided a method, operable by an imaging device, for preventing focus hunting during a phase detection auto focus (AF) process. The method can comprise capturing an image of a scene; generating a phase difference value and a confidence level for the phase difference value based on the image; calculating a focus hunting metric based at least in part on the phase difference value and the confidence level, the focus hunting metric being indicative of the probability that a start or continuation of a focus search of the phase detection AF process would result in focus hunting; and preventing focus hunting via at least one of (i) preventing the start of the focus search and (ii) terminating the focus search, in response to the focus hunting metric meeting or exceeding a defined threshold value.

In another aspect, there is provided an imaging device, comprising an image sensor; at least one processor; and a memory storing computer-executable instructions for controlling the at least one processor to: capture, via the image sensor, an image of a scene; generate a phase difference value and a confidence level for the phase difference value based on the image; calculate a focus hunting metric based at least in part on the phase difference value and the confidence level, the focus hunting metric being indicative of the probability that a start or continuation of a focus search of a phase detection AF process would result in focus hunting; and prevent focus hunting via at least one of (i) preventing the start of the phase detection AF search and (ii) terminating the focus search, in response to the focus hunting metric meeting or exceeding a defined threshold value.

In yet another aspect, there is provided an apparatus comprising means for capturing an image of a scene; means for generating a phase difference value and a confidence level for the phase difference value based on the image; means for calculating a focus hunting metric based at least in part on the phase difference value and the confidence level, the focus hunting metric being indicative of the probability that a start or continuation of a focus search of a phase detection auto focus (AF) process would result in focus hunting; and means for preventing focus hunting in response to the focus hunting metric meeting or exceeding a defined threshold value.

In still another aspect, there is provided a non-transitory computer readable storage medium having stored thereon instructions that, when executed, cause a processor of a device to: capture an image of a scene; generate a phase difference value and a confidence level for the phase difference value based on the image; calculate a focus hunting metric based at least in part on the phase difference value and the confidence level, the focus hunting metric being indicative of the probability that a start or continuation of a focus search of a phase detection auto focus (AF) process would result in focus hunting; and preventing focus hunting via at least one of (i) preventing the start of the focus search and (ii) terminating the focus search, in response to the focus hunting metric meeting or exceeding a defined threshold value.

DETAILED DESCRIPTION

Figure 1A:
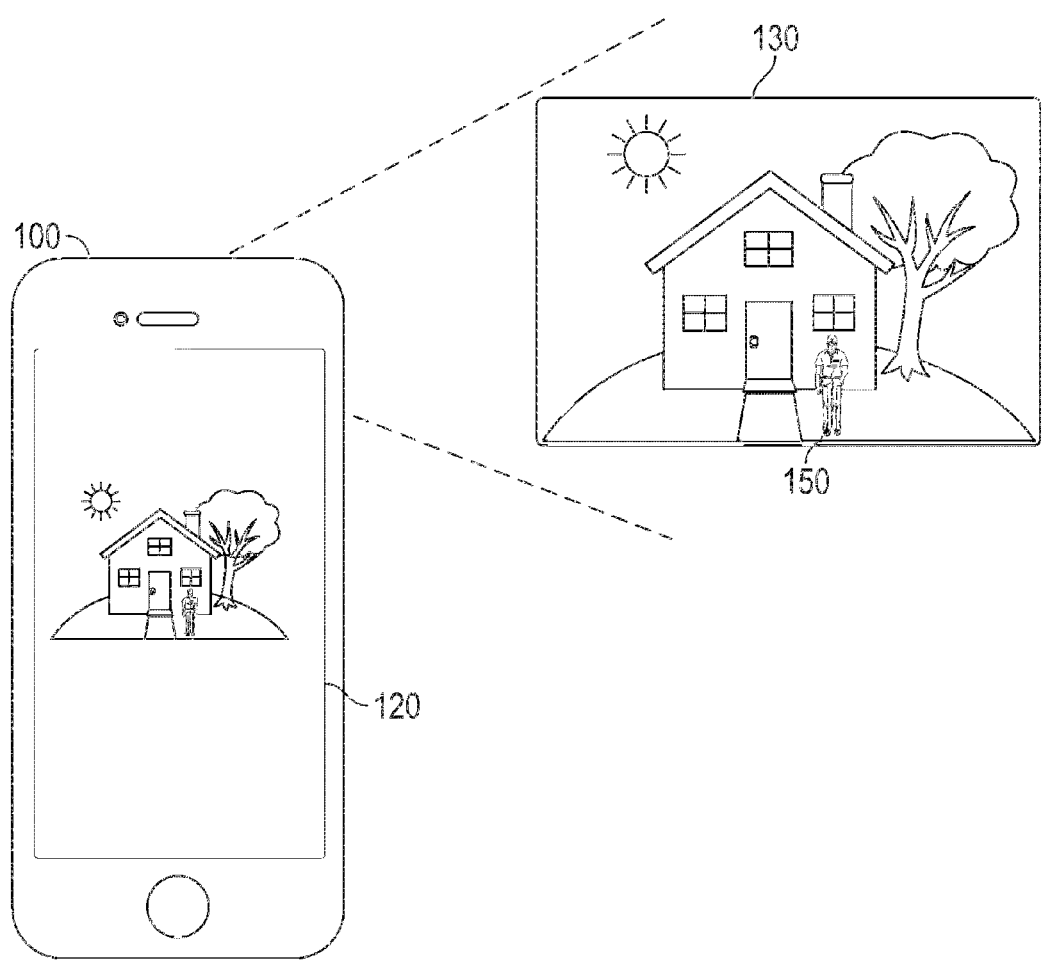
FIG. 1A illustrates an example of an apparatus (e.g., a mobile communication device) that includes an imaging system that can record images of a scene in accordance with aspects of this disclosure.

Digital camera systems or other imaging devices may perform auto focus (AF) to aid a user in bringing a scene into focus when capturing an image of the scene. One method for AF is phase detection AF which may be performed based on a phase difference measured between specialized pixels of an image sensor. The accuracy of phase detection AF may be related to the accuracy and robustness of the phase difference measurement. Phase detection AF techniques may infer a focal lens position (e.g., a lens position at which a captured image of a scene will be in focus) and a lens position shift value required to move from a current lens position to the focal lens position.

Phase detection AF may include the calculation of a confidence level corresponding to the measured phase difference. The confidence level may indicate the likelihood that the corresponding phase difference can be used to reliably predict the amount of lens shift required to achieve a focal lens position. The confidence level may be determined based on the content of the scene, for example, the sharpness of contrast in a captured image of the scene. In some implementations, phase detection AF may be determined based on vertical edges in the captured image due to the structure of the phase detection AF sensors. In these implementations, the confidence level may be determined based on the number of vertical edges contained within a region of interest since the number of edges may be correlated with the accuracy of a given phase difference measurement. When the confidence level meets or exceeds a threshold confidence level, a phase detection AF process may determine that the phase difference measurement is sufficiently accurate for performing phase detection AF. In contrast, when the confidence level does not meet the threshold confidence level, the phase detection AF process may determine that the phase difference measurement is not accurate enough for performing phase detection AF, and may wait for a more reliable phase difference measurement (e.g., a phase difference measurement having a confidence level higher than the threshold confidence level).

Regardless of the method used in determining the confidence level, there may still exist corner cases where the calculated confidence level is inaccurate. This may lead to undesirable behavior of the imaging system, such as focus hunting. Focus hunting may refer to the movement of the lens during an AF process without the AF process finding a stable focal lens position. Focus hunting may be more likely to occur for certain types of scene content. In cases that result in focus hunting, the confidence level may be relatively high (e.g., exceeding a confidence level threshold) while the phase difference is not accurate, which leads the phase detection AF process to move the lens based on the inaccurate phase difference. One aspect of this disclosure relates to a method of identifying these corner cases such that unintended lens movement due to focus hunting may be prevented.

The following detailed description is directed to certain specific embodiments. However, the described technology can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, and mobile internet devices. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1A illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1A shows an object 150 (e.g., a person) within the field of view 130 which may be captured by the camera. A processor within the apparatus 100 may prevent focus hunting based on the captured image of the scene.

Figure 1B:
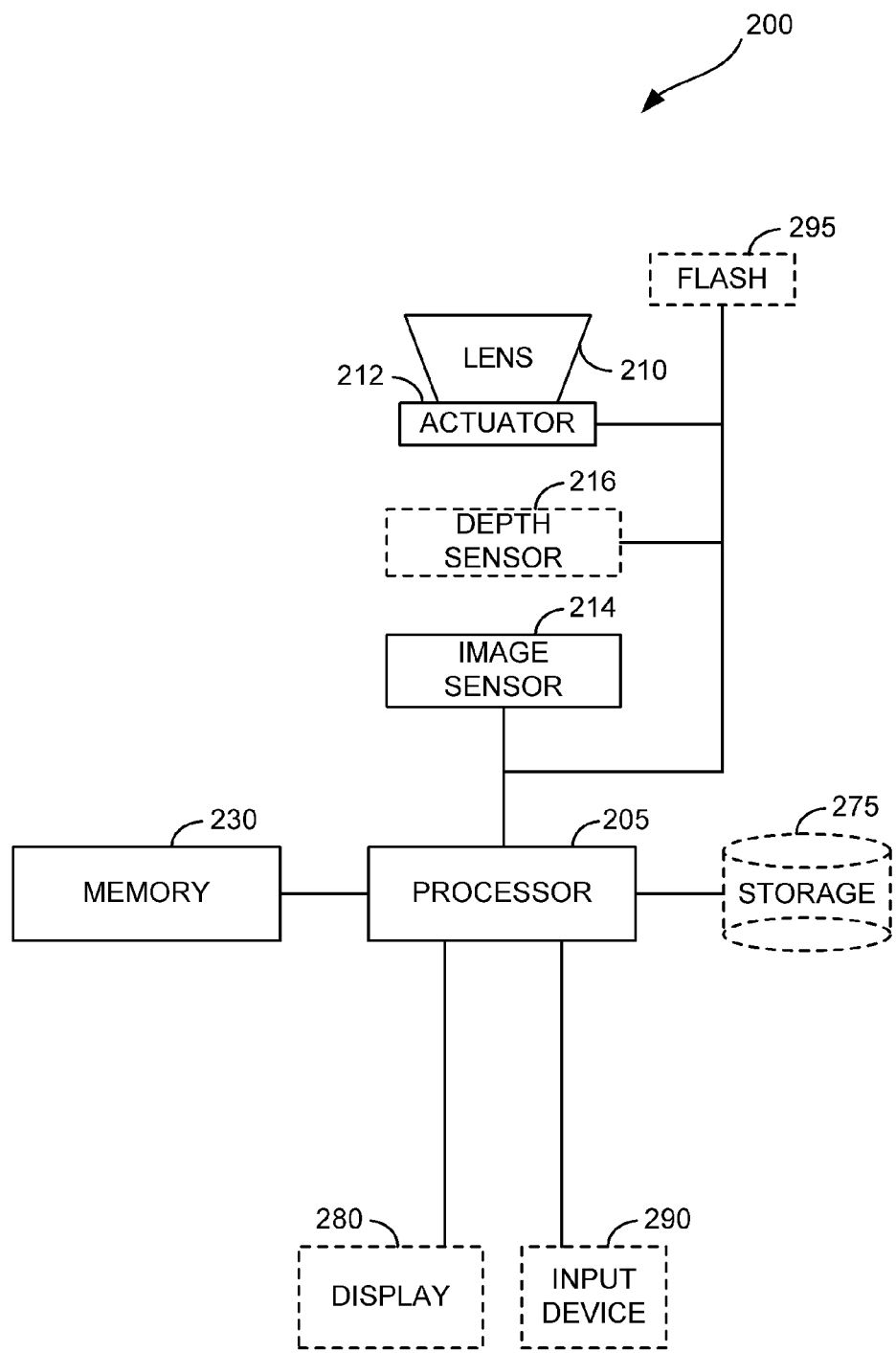
FIG. 1B is a block diagram illustrating an example of an imaging device in accordance with aspects of this disclosure.

FIG. 1B depicts a block diagram illustrating an example of an imaging device in accordance with aspects of this disclosure. The imaging device 200, also referred herein to interchangeably as a camera, may include a processor 205 operatively connected to an image sensor 214, an optional depth sensor 216, a lens 210, an actuator 212, a memory 230, an optional storage 275, an optional display 280, an optional input device 290, and an optional flash 295. In this example, the illustrated memory 230 may store instructions that, when executed, cause the processor 205 to perform functions relating to the imaging device 200. In this example, the memory 230 may include instructions for instructing the processor 205 to prevent focus hunting from occurring during phase detection AF.

In an illustrative embodiment, light enters the lens 210 and is focused on the image sensor 214. In some embodiments, the lens 210 may include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may affect the focus of a captured image. The actuator 212 is configured to move the lens 210 in a series of one or more lens movements during an AF operation, for example, adjusting the lens position to change the focus of an image. When the lens 210 reaches a boundary of its movement range, the lens 210 or actuator 212 may be referred to as saturated. In an illustrative embodiment, the actuator 212 is an open-loop voice coil motor (VCM) actuator. However, the lens 210 may be actuated by any method known in the art including a closed-loop VCM, Micro-Electronic Mechanical System (MEMS), or a shape memory alloy (SMA).

The depth sensor 216 is configured to estimate the depth of an object to be captured in an image by the imaging device 200. The depth sensor 216 may be configured to perform a depth estimation using any technique applicable to determining or estimating depth of an object or scene with respect to the imaging device 200, including AF techniques for estimating depth such as phase detection AF, time-of-flight AF, laser auto focus, or stereo AF. The techniques may also be applied using depth or location information received by the imaging device 200 from or about an object within a scene. Depending on the AF technique employed, the depth sensor 216 may be integrated into other components of the imaging device 200. For example, when using phase detection AF, the image sensor 214 may include specialized phase detection pixels which may be partially masked. These phase detection pixels may be formed as pairs referred to as "left" and "right" phase detection pixels.

The display 280 is configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

Figure 6:
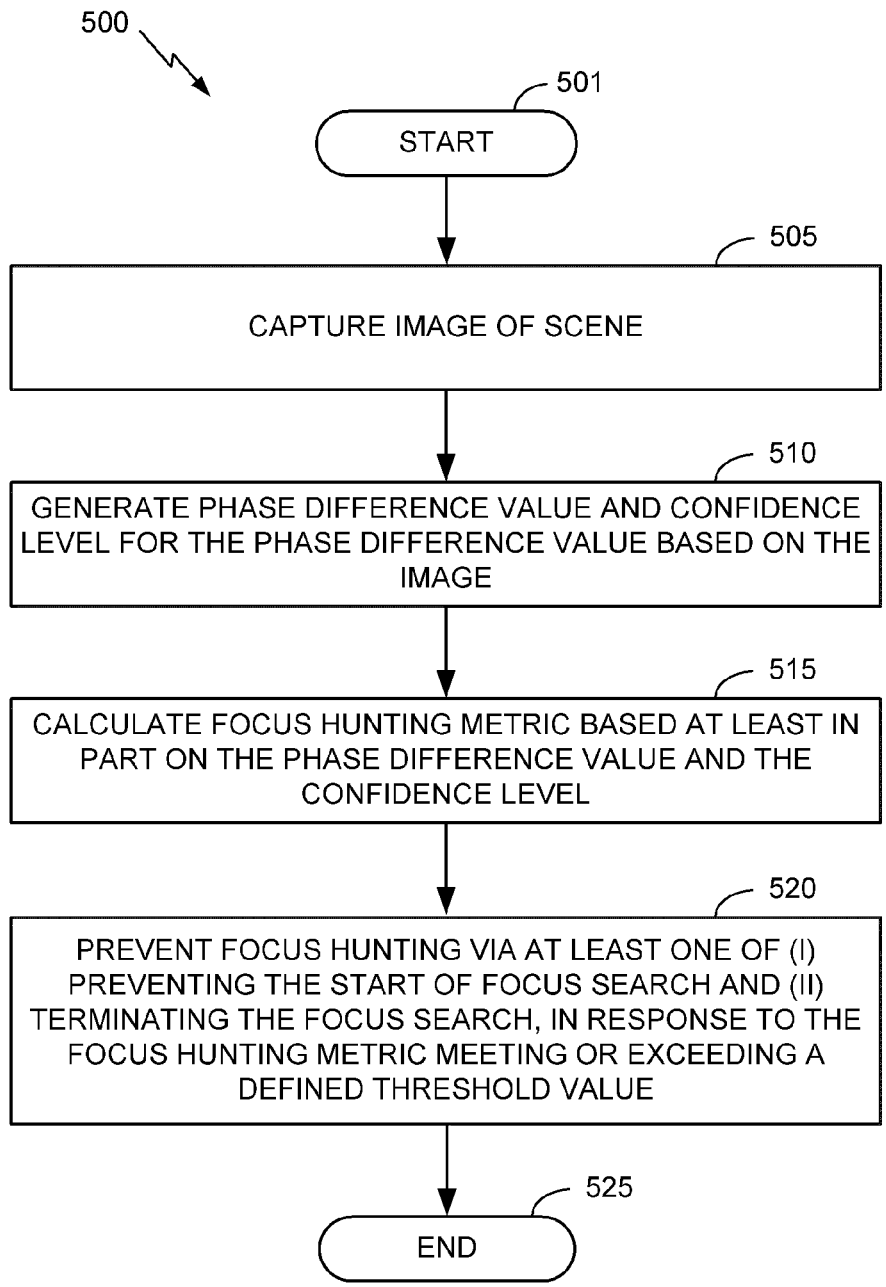
FIG. 6 is a flowchart illustrating an example method operable by an imaging device in accordance with aspects of this disclosure.

The memory 230 may be considered a computer readable medium and stores instructions for instructing the processor 205 to perform various functions in accordance with this disclosure. For example, in some aspects, memory 230 may be configured to store instructions that cause the processor 205 to perform method 500, or portion(s) thereof, as described below and as illustrated in FIG. 6.

In one implementation, the instructions stored in the memory 230 may include instructions that, when executed, cause the processor 205 to determine lens positions in a range of lens positions of the lens 210 that may include a desired lens position for capturing an image. The determined lens positions may not include every possible lens position within a range of lens positions, but may include only a subset of the possible lens positions within the range of lens positions. The determined lens positions may be separated by a step size of one or more possible lens positions between determined lens positions. For example, the determined lens positions can include a first lens position at one end of the range of lens positions, the first lens position representing a first focusing distance, and a second lens position at the other end of the range of lens positions, the second lens position representing a second focusing distance. The determined lens positions may further include one or more intermediate lens positions, each intermediate lens position representing a focusing distance between the first and second focusing distances, where the determined lens positions are separated by a step size of one or more possible lens positions between the determined lens positions in the first range of lens positions. In an illustrative embodiment, the processor 205 may determine lens positions in a range of lens positions based at least in part on an estimation of the depth of an object. When executed, the instructions may also cause the processor 205 to determine or generate focus values for images captured at one or more lens positions within the range of lens positions. The desired lens position for capturing an image may be a lens position having a maximum focus value. When executed, the instructions may also cause the processor 205 to determine or generate a focus value curve or data representative of a focus value curve based on the determined or generated focus values. When executed, the instructions may also cause the processor 205 to determine lens positions in a search range of lens positions based at least in part on generated focus values or a focus value curve or data representative of a focus value curve based on a previous search range of lens positions.

Phase Detection AF Techniques

Figure 2:
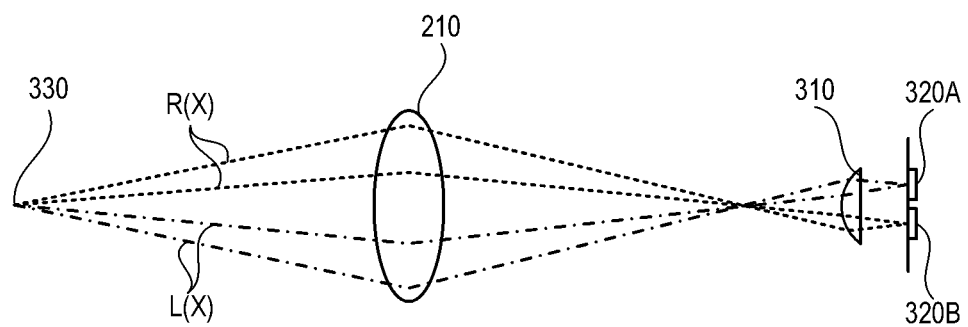
FIG. 2 provides an example of a ray trace of light entering a pair of phase detection photodiodes.

As described above, an imaging device 200 that may perform phase detection AF in accordance with aspects of this disclosure may include specialized phase detection pixels which may be partially masked. These phase detection pixels may be arranged into pairs of pixels, including "left" and "right" phase detection pixels. FIG. 2 provides an example of a ray trace of light entering a pair of phase detection photodiodes. The example of FIG. 2 includes a lens 210, a microlens 310, a pair of photodiodes 320A and 320B, and light 330. The microlens 310 and photodiodes 320A and 320B may be included in an image sensor 214 of an imaging device 200. It will be appreciated that the dimensions of the lens 210 and the microlens 310 are not shown to scale. The light 330 may be split into a left set of light rays L(x) and a right set of light rays R(x).

Specifically, FIG. 2 depicts an example light ray 330 trace of an in-focus condition. The light 330 travels from a point in a target scene, travels through lens 210 for focusing the target scene onto an image sensor 214 including the photodiodes 320A and 320B. The light 330 passes through the microlens 110 before falling on the photodiodes 320A and 320B. As illustrated, photodiode 320A receives light from a left set of light rays L(x) and photodiode 320B receives light from a right set of light rays R(x).

When the image is in focus, the left set of light rays L(x) and right set of light rays R(x) converge at the plane of the photodiodes 320A and 320B. When the light converges in front or behind the plane of the photodiodes, 320A and 320B, the image is out of focus. When the image is out of focus, the lens 210 can be moved forward (toward the image sensor) or backward (away from the image sensor) depending on whether the focal point is in front of the subject (closer to the image sensor), or behind the subject (farther away from the image sensor). The phase detection AF process may determine the amount and direction of lens position shift required to bring the image into focus based on specialized phase detection pixels.

Figure 3:
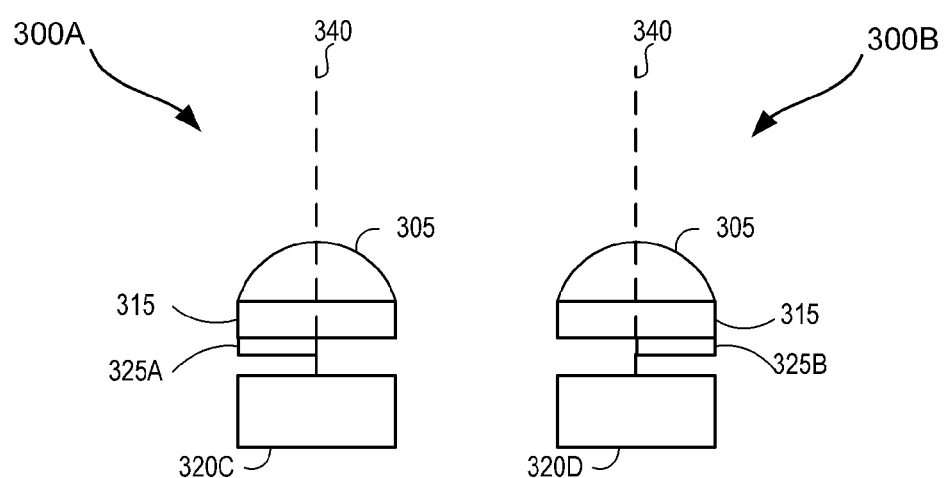
FIG. 3 provides an illustration of an example pair of specialized phase detection pixels.

FIG. 3 provides an illustration of an example pair of specialized phase detection pixels. Each of the phase detection pixels 300A and 300B (also referred to simply as pixels) of FIG. 3 includes a microlens 305, an optional color filter 315, a light mask 325A or 325B, and a photodiode 320C or 320D. A center line 340 is shown in FIG. 3 for each of the pixels 300A, 300B. The pair of pixels 300A and 300B form left and right pixels and are used together by the processor

205 to measure phase difference for a captured image. Further, the light masks 325A and 325B are respectively formed on opposing sides of the pixels 300A and 300B. The processor 205 may measure the phase difference based on whether the light masks 325A and 325B block or let past light incident on the pixels 300A and 300B.

Figure 4:
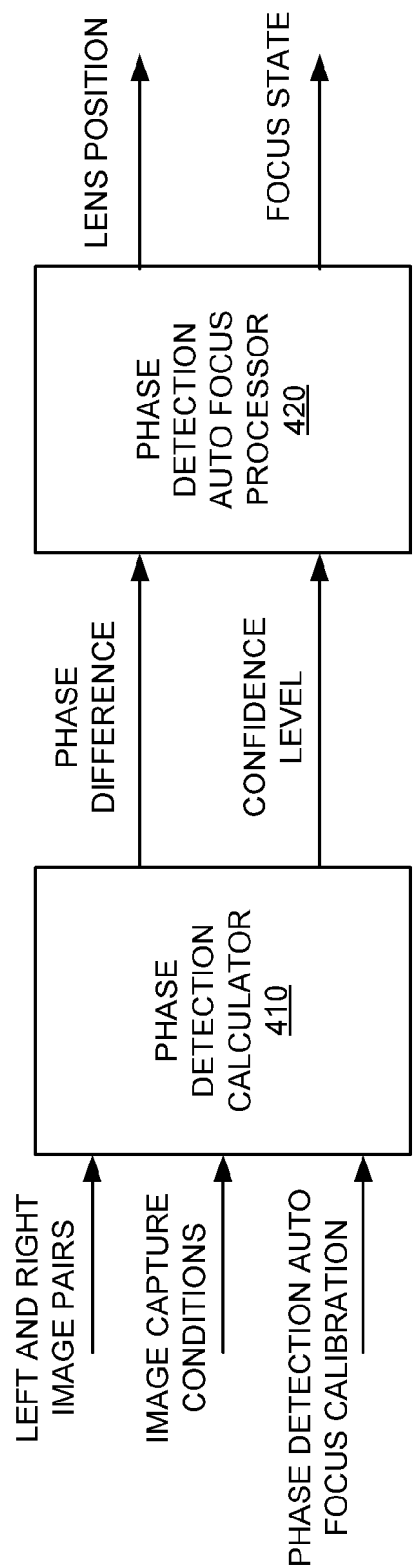
FIG. 4 is a block diagram which illustrates an example of phase detection AF that may be performed in accordance with aspects of this disclosure.

FIG. 4 is a block diagram which illustrates an example of phase detection AF that may be performed in accordance with aspects of this disclosure. Each of the blocks illustrated in FIG. 4 may be implemented via a processor 205 or specialized hardware. The phase detection AF process of FIG. 4 includes a phase detection calculator 410 and a phase detection AF processor 420. The phase detection calculator 410 may receive left and right image pairs from specialized left and right phase detection pixels 300A and 300B as inputs. The phase detection calculator 410 may also receive image capture conditions under which the left and right image pairs were obtained from the processor 205. In some implementations, the capture conditions may include: analog and/or digital gain values which are applied to the captured image by the image sensor 214 and the exposure time used during the capture of the image. The analog and/or digital gain values and the exposure time may be determined and/or generated by the processor 205. Lastly, the phase detection calculator 410 receives phase detection AF calibration values. The phase detection calculator 410 determines the phase difference and a corresponding confidence level based on the left and right image pairs, the image capture conditions, and the phase detection AF calibration values.

The phase detection AF processor 420 receives the calculated phase difference and the corresponding confidence level from the phase detection calculator 410. Based on the received phase difference and the received confidence level, the phase detection AF processor 420 determines a lens position (e.g., a next lens position closer to a focal lens position) and a focus state. The focus state may refer to the state of whether AF is currently being performed. That is, when the lens position is not altered by the phase detection AF processor 420, the focus state may be a "monitoring" state. Further, when the lens position is updated by the phase detection AF processor 420, the focus state may be a "currently searching" state where the phase detection AF processor 420 is currently performing phase detection AF. In some implementation, the focus state may be represented by a binary flag value. The phase detection AF processor 420 may perform phase detection AF via an iterative loop which incrementally moves the lens position closer to a focal lens position based on the phase difference and confidence level inputs. Additionally, the phase detection AF processor 420 may perform phase detection AF (e.g., enter an "currently searching" state), when the confidence level meets or exceed a confidence level threshold.

Phase Detection AF with Focus Hunting Prevention

Figure 5:
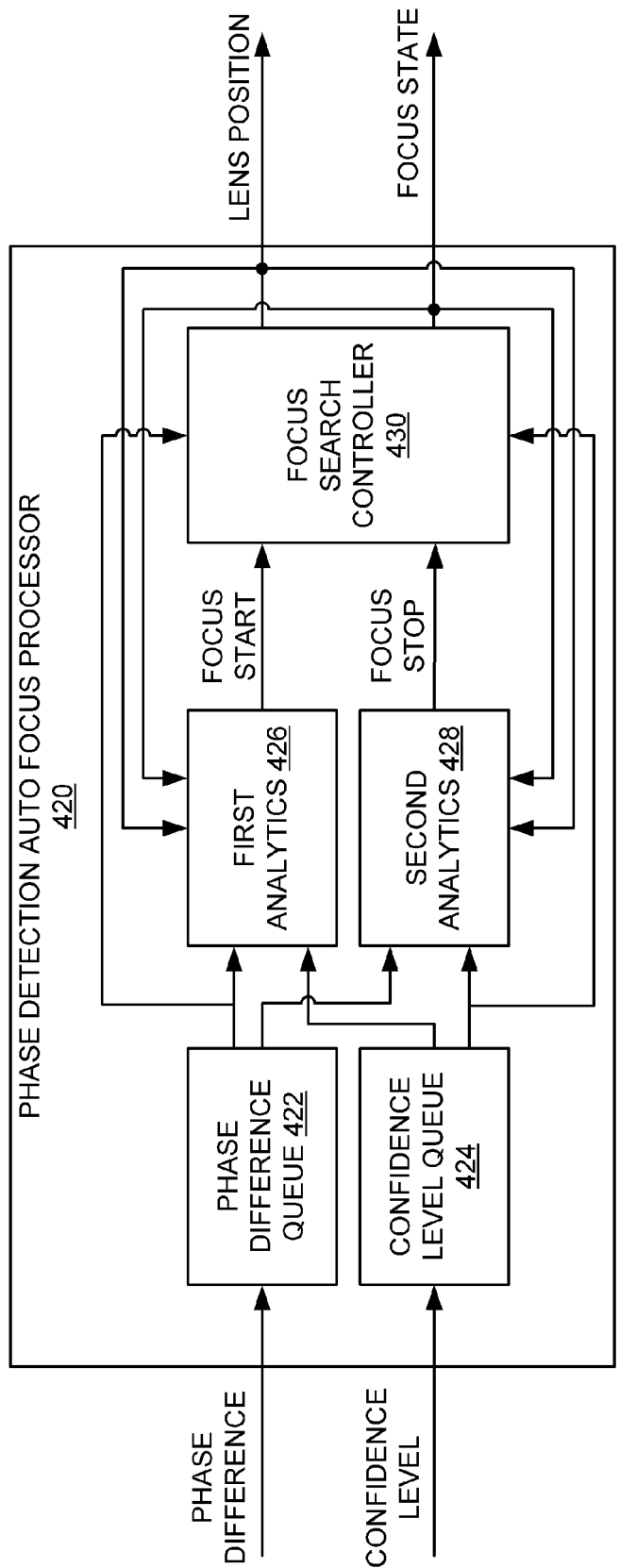
FIG. 5 is a block diagram illustrating an example of the phase detection AF processor of FIG. 4 in accordance with aspects of this disclosure.

FIG. 5 is a block diagram illustrating an example of the phase detection AF processor of FIG. 4 in accordance with aspects of this disclosure. The phase detection AF processor 420 includes the same inputs (a phase difference and a confidence level) and has the same outputs (a lens position and a focus state) as the phase detection AF processor 420 of FIG. 4. The phase detection processor 420 of FIG. 5 includes a phase difference queue 422, a confidence level queue 424, a first analytics 426, a second analytics 428, and a focus search 530. The phase difference queue 422 and the confidence level queue 424 respectively store the values of the phase difference and confidence level inputs for a defined period of time. When the phase difference AF processor 420 is implemented in a processor 205, the phase difference queue 422 and the confidence level queue 424 may be implemented by storing the histories of the phase differences and confidence levels in a register or memory for retrieval by the first and second analytics 426 and 428. When the phase difference AF processor 420 is implemented in hardware, each of the phase difference queue 422 and the confidence level queue 424 may be implemented by dedicated hardware components such as registers or buffers.

Each of the first and second analytics 426 and 428 may receive histories of the phase differences and confidence levels from the phase difference and confidence level queues 422 and 424, and the current lens position and the current focus state from the focus search controller 430. The first analytics 426 may output a focus start signal to the focus search controller 430 and the second analytics 428 may output a focus stop signal to the focus search controller 430. In one implementation, each of the first and second analytics 426 and 428 may be implemented via a processor 205, which determines certain metrics based on the received inputs and compares the metrics against defined thresholds. In another implementation, each of the first and second analytics 426 and 428 may be implemented via a filter (e.g., a temporal filter) which may be linear or adaptive (e.g., non-linear).

In at least one implementation, the temporal filters may determine the difference between the maximum and minimum values stored in the phase difference queue 422. When the difference is greater than a threshold difference value, the temporal filter of the first analytics 426 may delay outputting the focus start signal until the difference is less than the threshold difference value. That is, when the difference is greater than the threshold difference value, the phase difference history may not be sufficiently stable to start a focus search. When the difference is greater than a threshold difference value, the temporal filter of the second analytics 428 may output the focus stop signal, terminating a current focus search. In some implementations, the threshold difference values used by the first and second analytics 425 and 428 may be different. Additionally, the first and second analytics 426 and 428 may adjust the threshold difference values based on the confidence levels stored in the confidence level queue 424. For example, the first and second analytics 425 and 428 may alter the threshold difference value when the confidence levels are less than a threshold confidence value. The observed confidence level may also be used to select only the phase difference sample(s) having confidence level(s) that exceed a minimum threshold confidence level to be used by the temporal filters of 426 and 428.

The focus search controller 430 determines whether to start or terminate a focus search based on the focus start signal and the focus stop signal. For example, when the focus search controller 430 receives the focus start signal, the focus search controller 430 will initiate a focus search including moving the lens based on the phase difference and the associated confidence level and update the focus state to "currently searching." The focus search controller 430 will continue updating the lens position in the "currently searching" state until the updated lens position matches the current lens position or the focus search controller 430 receives a focus stop signal. After the updated lens position matches the current lens position or the focus search controller 430 receives a focus stop signal, the focus search controller 430 will terminate the focus search, which may include refraining from updating the lens position and changing the focus state to "monitoring."

The first and second analytics 426 and 428 may detect and prevent focus hunting based on the current lens position, the current focus state, and the histories of the phase difference and confidence level respectively stored in the phase difference queue 422 and the confidence level queue 424. The first and second analytics 426 and 428 may detect focus hunting based on the calculation of a metric indicative of the probability that a start or continuation of a focus search would result in focus hunting.

One type of focus hunting that may be prevented in accordance with aspects of this disclosure is "false start" focus search. Under certain circumstances, the current phase difference and the current confidence level may be consistent with the conditions for initiating a focus search. However, as discussed above, in corner cases, the phase difference and the confidence level may be inaccurate, leading to the initiation of a focus search when the scene is not out of focus. The initiation of the focus search while the image is in focus and stable may be referred to as a "false start" focus search.

In order to identify and prevent a "false start" focus search from occurring, the first and second analytics 426 and 428 may compare a metric generated based on the histories of the phase differences and the confidence levels to a threshold metric. Since a "false start" focus search occurs during a "monitoring" focus state, the first and second analytics 426 and 428 may first determine that the focus state is "monitoring" before attempting to identify a "false start" focus search condition in the phase difference and confidence level values. One metric that may be considered by the first and second analytics 426 and 428 is the temporal stability of each of the phase differences and confidence levels. For example, if one or more of the phase difference and the confidence level is anomalous for a short period of time and returns to a stable value (e.g., is within a threshold level of recent historic values), the anomalous values may not be representative of the captured image being out of focus (e.g., the anomalous value may be identified as spurious). As such, the first analytics 426 may refrain from outputting a focus start signal until the phase difference and the confidence level are temporally stable, thereby preventing focus search from being initiated due to spurious phase difference and/or confidence level values. The detection of spurious values by the first and second analytics 426 and 428 may also be performed by imposing other metrics or conditions of the historical values of the phase difference and the confidence level. In one embodiment, these metrics and/or the temporal stability metric may be implemented by filters within the first and second analytics 426 and 428. The filters may be implemented in specialized hardware or via a processor 205.

Another type of focus hunting that may be detected and prevented by the phase detection AF processor 420 is an "erratic" focus search. "Erratic" focus search may refer to the focus search continually moving the lens position without obtaining a stable focal position. This may occur, for example, after moving or panning the imaging device 200 to a new scene. After moving to a new scene, the phase difference and confidence level values may still be representative of the previous scene, and thus, may lead to undesirable focus search behavior if the focus search is performed on the new scene on the basis of the phase difference and confidence level values related to the previous scene. Accordingly, another aspect of this disclosure is to identify an "erratic" focus search and terminate the "erratic" focus search.

One expected behavior of a focus search may be the identification of a focal lens position within a defined period of time via a monotonic improvement in focus quality (e.g., from out of focus to in focus). Since "erratic" focus search behavior may occur during focus search, the first and second analytics 426 and 428 may determine whether the focus state is a "currently searching" state. When the focus state is the "currently searching" state, the first and second analytics 426 and 428 may determine a metric that may be indicative of an "erratic" focus search.

In one implementation, the first and second analytics 426 and 428 may determine whether the focus search converges on the focal lens portion by analyzing a metric indicative of the number of times that the direction of movement of the lens position changes. The second analytics 428 may terminate the focus search via the generation of the focus stop signal based on an analysis of the lens position received from the focus search controller 430. For example, the second analytics 428 may calculate the number of times that the lens position has changed direction based on the lens position signal received from the focus search controller 430 and may terminate the focus search when the number of times that the lens position has changed direction meets or exceeds a threshold number of times.

In another implementation, the second analytics 428 may generate the focus stop signal to terminate the "erratic" focus search when a metric indicative of the amount of time for the focus search meets or exceeds a threshold time. For example, the second analytics 428 may determine the number of frames (e.g., the number of captured images during the focus search) and compare the number of frames to a threshold number of frames. This may limit the length of time allowed for the focus search to converge on a focal lens position. After the focus search controller 430 has terminated the focus search in response to the focus stop signal, a contrast AF process may be performed in place of the phase detection AF process. In one implementation, any of the conditions for terminating an "erratic" focus search may be implemented by one or more filters (e.g., a temporal filter) which may be linear or adaptive (e.g., non-linear).

Example Flowcharts for Preventing Focus Hunting for Phase Detection AF

FIG. 6 is a flowchart illustrating an example method 500 operable by an imaging device 200, or component(s) thereof, for focus hunting prevention for phase detection AF in accordance with aspects of this disclosure. For example, the steps of method 500 illustrated in FIG. 6 may be performed by a processor 205 of the imaging device 200. For convenience, method 500 is described as performed by the processor 205 of the imaging device 200.

The method 500 begins at block 501. At block 505, the processor 205 captures an image of a scene. At block 510, the processor 205 generates a phase difference value and a confidence level for the phase difference value based on the image. The processor 205 may store the phase difference value and the confidence level in a memory 230 to maintain histories of the phase difference value and the confidence level. At block 515, the processor 205 calculates a focus hunting metric based at least in part on the phase difference value and the confidence level. The focus hunting metric may be indicative of the probability that a start or continuation of a focus search of a phase detection AF process would result in focus hunting. At block 520, the processor 205 prevents focus hunting via at least one of (i) preventing the start of the focus search and (ii) terminating the focus search, in response to the focus hunting metric meeting or exceeding a defined threshold value. The method 500 ends at block 525.

Other Considerations

In some embodiments, the circuits, processes, and systems discussed above may be utilized in a wireless communication device, such as apparatus 100. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, and a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may include random-access memory (RAM), read-only memory (ROM), electrically erasable programmable read-only memory (EEPROM), flash memory or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method, operable by an imaging device, for preventing focus hunting during a phase detection auto focus (AF) process, the method comprising:
   capturing an image of a scene;
   generating a phase difference value and a confidence level for the phase difference value based on the image, the confidence level being indicative of a likelihood that the phase difference corresponds to an amount of lens shift required to achieve a focal lens position;
   calculating a metric based at least in part on the phase difference value and the confidence level, the metric being indicative of whether a start or continuation of a focus search of the phase detection AF process would not result in finding the focal lens position; and
   performing at least one of (i) preventing the start of the focus search and (ii) terminating the focus search, in response to the metric meeting or exceeding a defined threshold value.

2. The method of claim 1, further comprising storing the phase difference value and the confidence level in a memory, wherein the calculating the metric is further based on a plurality of phase difference values and a plurality of confidence levels stored in the memory.

3. The method of claim 2, wherein the calculating of the metric comprises applying a filter to each of the phase difference values and the confidence levels stored in the memory.

4. The method of claim 2, further comprising:
   determining that the phase difference value is indicative of the image being out of focus;
   determining that the confidence level is greater than a threshold confidence level; and
   starting the focus search in response to: i) determining that the phase difference value is indicative of the image being out of focus, ii) determining that the confidence level is greater than the threshold confidence level, iii) determining that the phase difference value is within a threshold level of the stored phase difference values, and iv) determining that the confidence level value is within a threshold level of the stored confidence levels.

5. The method of claim 1, wherein the imaging device further comprises a lens, the method further comprising analyzing a position of the lens and a focus state of the lens to detect whether a start or continuation of a focus search of the phase detection AF process would not result in finding the focal lens position.

6. The method of claim 1, wherein the imaging device further comprises a lens, the method further comprising:
   performing the focus search including moving the lens to a first lens position, wherein the calculating of the metric comprises determining a number of times that the direction of movement of the lens has reversed; and
   terminating the focus search in response to the number of times that the direction of movement of the lens has reversed meeting or exceeding a threshold number of times.

7. The method of claim 6, further comprising performing a contrast focus search in response to terminating the focus search of the phase detection AF process.

8. The method of claim 1, wherein the imaging device further comprises a lens, the method further comprising:
   performing the focus search including: incrementally moving the lens closer to a first lens position and capturing a subsequent image at each incremental lens position, wherein the calculating of the metric comprises determining the number of subsequent images; and
   terminating the focus search in response to the number of subsequent images meeting or exceeding a threshold number of subsequent images.

9. The method of claim 1, wherein the calculating of the metric comprises:
   performing a first analysis of the phase difference value and the confidence level to determine whether to start the focus search; and
   performing a second analysis of the phase difference value and the confidence level to determine whether to terminate the focus search.

10. An imaging device, comprising:
    an image sensor;
    at least one processor; and
    a memory storing computer-executable instructions for controlling the at least one processor to:
       capture, via the image sensor, an image of a scene;
       generate a phase difference value and a confidence level for the phase difference value based on the image, the confidence level being indicative of a likelihood that the phase difference corresponds to an amount of lens shift required to achieve a focal lens position;
       calculate a metric based at least in part on the phase difference value and the confidence level, the metric being indicative of whether a start or continuation of a focus search of a phase detection AF process would not result in finding the focal lens position; and
       performing at least one of (i) preventing the start of the phase detection AF search and (ii) terminating the focus search, in response to the metric meeting or exceeding a defined threshold value.

11. The imaging device of claim 10, wherein the computer-executable instructions are further for controlling the at least one processor to:
    store the phase difference value and the confidence level in a memory,
    wherein the calculating the metric is further based on a plurality of phase difference values and a plurality of confidence levels stored in the memory.

12. The imaging device of claim 11, wherein the computer-executable instructions are further for controlling the at least one processor to:
    apply a filter to each of the phase difference values and the confidence levels stored in the memory.

13. The imaging device of claim 11, the computer-executable instructions being further for controlling the at least one processor to:
    determine that the phase difference value is indicative of the image being out of focus;
    determine that the confidence level is greater than a threshold confidence level; and
    start the focus search in response to: i) determining that the phase difference value is indicative of the image being out of focus, ii) determining that the confidence level is greater than the threshold confidence level, iii) determining that the phase difference value is within a threshold level of the stored phase difference values, and iv) determining that the confidence level value is within a threshold level of the stored confidence levels.

14. The imaging device of claim 10, further comprising a lens, the computer-executable instructions being further for controlling the at least one processor to analyze a position of the lens and a focus state of the lens to detect whether a start or continuation of a focus search of the phase detection AF process would not result in finding the focal lens position.

15. The imaging device of claim 10, further comprising a lens, the computer-executable instructions being further for controlling the at least one processor to:
perform the focus search including moving the lens to a first lens position;
determine a number of times that the direction of movement of the lens has reversed, and
terminate the focus search in response to the number of times that the direction of movement of the lens has reversed meeting or exceeding a threshold number of times.

16. The imaging device of claim 15, wherein the computer-executable instructions are further for controlling the at least one processor to perform a contrast focus search in response to terminating the focus search of the phase detection AF process.

17. The imaging device of claim 10, further comprising a lens, the computer-executable instructions being further for controlling the at least one processor to:
perform the focus search including: incrementally moving the lens closer to a first lens position and capturing a subsequent image at each incremental lens position;
determine the number of subsequent images, and
terminate the focus search in response to the number of subsequent images meeting or exceeding a threshold number of subsequent images.

18. The imaging device of claim 10, wherein the computer-executable instructions are further for controlling the at least one processor to:
perform a first analysis of the phase difference value and the confidence level to determine whether to start the focus search; and
perform a second analysis of the phase difference value and the confidence level to determine whether to terminate the focus search.

19. An apparatus, comprising:
means for capturing an image of a scene;
means for generating a phase difference value and a confidence level for the phase difference value based on the image, the confidence level being indicative of a likelihood that the phase difference corresponds to an amount of lens shift required to achieve a focal lens position;
means for calculating a metric based at least in part on the phase difference value and the confidence level, the metric being indicative of whether a start or continuation of a focus search of a phase detection auto focus (AF) process would not result in finding the focal lens position; and
means for performing at least one of (i) preventing the start of the focus search and (ii) terminating the focus search, in response to the metric meeting or exceeding a defined threshold value.

20. The apparatus of claim 19, further comprising means for storing the phase difference value and the confidence level in a memory, wherein the calculating the metric is further based on a plurality of phase difference values and a plurality of confidence levels stored in the memory.

21. The apparatus of claim 20, wherein the means for calculating the metric comprises means for applying a filter to each of the phase difference values and the confidence levels stored in the memory.

22. The apparatus of claim 20, the apparatus further comprising:
means for determining that the phase difference value is indicative of the image being out of focus;
means for determining that the confidence level is greater than a threshold confidence level; and
means for starting the focus search in response to: i) determining that the phase difference value is indicative of the image being out of focus, ii) determining that the confidence level is greater than the threshold confidence level, iii) determining the phase difference value is within a threshold level of the stored phase difference values, and iv) determining that the confidence level value is within a threshold level of the stored confidence levels.

23. The apparatus of claim 19, further comprising means for analyzing a position of a lens and a focus state of the lens to detect whether a start or continuation of a focus search of the phase detection AF process would not result in finding the focal lens position.

24. The apparatus of claim 19, further comprising:
means for performing the focus search including moving the lens to a first lens position, wherein the means for calculating the metric comprises means for determining a number of times that the direction of movement of the lens has reversed; and
means for terminating the focus search in response to the number of times that the direction of movement of the lens has reversed meeting or exceeding a threshold number of times.

25. The apparatus of claim 24, further comprising means for performing a contrast focus search in response to terminating the focus search of the phase detection AF process.

26. A non-transitory computer readable storage medium having stored thereon instructions that, when executed, cause a processor of a device to:
capture an image of a scene;
generate a phase difference value and a confidence level for the phase difference value based on the image, the confidence level being indicative of a likelihood that the phase difference corresponds to an amount of lens shift required to achieve a focal lens position;
calculate a metric based at least in part on the phase difference value and the confidence level, the metric being indicative of whether a start or continuation of a focus search of a phase detection auto focus (AF) process would not result in finding the focal lens position; and
perform at least one of (i) preventing the start of the focus search and (ii) terminating the focus search, in response to the metric meeting or exceeding a defined threshold value.

27. The non-transitory computer readable storage medium of claim 26, further having stored thereon instructions that, when executed, cause the processor to store the phase difference value and the confidence level in a memory, wherein the calculating of the metric is further based on a plurality of phase difference values and a plurality of confidence levels stored in the memory.

28. The non-transitory computer readable storage medium of claim 27, further having stored thereon instructions that, when executed, cause the processor to apply a filter to each of the phase difference values and the confidence levels stored in the memory.

29. The non-transitory computer readable storage medium of claim 27, the non-transitory computer readable storage medium further having stored thereon instructions that, when executed, cause the processor to:
  determine that the phase difference value is indicative of the image being out of focus;
  determine that the confidence level is greater than a threshold confidence level; and
  start the focus search in response to: i) determining that the phase difference value is indicative of the image being out of focus, ii) determining that the confidence level is greater than the threshold confidence level, iii) determining that the phase difference value is within a threshold level of the stored phase difference values, and iv) determining that the confidence level value is within a threshold level of the stored confidence levels.

30. The non-transitory computer readable storage medium of claim 26, further having stored thereon instructions that, when executed, cause the processor to analyze a position of a lens and a focus state of the lens to detect whether a start or continuation of a focus search of the phase detection AF process would not result in finding the focal lens position.

* * * * *